(12) United States Patent
Valin

(10) Patent No.: US 6,503,970 B1
(45) Date of Patent: Jan. 7, 2003

(54) CO-PROCESSED PIGMENTS

(75) Inventor: Roland J. Valin, Cranbury, NJ (US)

(73) Assignee: Engelhard Corporation, Iselin, NJ (US)

( * ) Notice: Subject to any disclaimer, the term of this patent is extended or adjusted under 35 U.S.C. 154(b) by 39 days.

(21) Appl. No.: 09/675,887

(22) Filed: Sep. 29, 2000

(51) Int. Cl.⁷ .............................................. C08K 5/29
(52) U.S. Cl. ........................ 524/241; 524/413; 106/440
(58) Field of Search ................ 106/440; 524/241, 524/413

(56) References Cited

U.S. PATENT DOCUMENTS

| | | | |
|---|---|---|---|
| 4,080,321 A | 3/1978 | Kuntsmann et al. | 260/157 |
| 4,222,788 A | 9/1980 | Liedek et al. | 106/289 |
| 4,226,634 A | 10/1980 | Dimroth et al. | 106/288 |
| 4,392,999 A | 7/1983 | Muller et al. | 260/157 |
| 4,555,568 A | 11/1985 | Hunger | 534/801 |
| 4,664,714 A | 5/1987 | Katsura et al. | 106/308 N |
| 5,274,010 A | 12/1993 | Bugnon et al. | 523/206 |
| 5,352,281 A | 10/1994 | Weide et al. | 106/20 R |
| 5,756,757 A | 5/1998 | Meier et al. | 548/306.4 |
| 5,830,929 A * | 11/1998 | Stramel | 523/200 |
| 5,958,129 A * | 9/1999 | Urban et al. | 106/498 |
| 6,036,764 A | 3/2000 | Gooding et al. | 106/440 |

\* cited by examiner

Primary Examiner—Edward J. Cain
(74) Attorney, Agent, or Firm—Raymond F. Keller

(57) ABSTRACT

One aspect of the invention relates to a yellow pigment composition containing at least one yellow nickel titanate and at least one yellow organic pigment containing a benzimidazolone moiety. Another aspect of the invention relates to a method of making a yellow pigment composition involving the steps of combining at least one yellow nickel titanate and at least one yellow benzimidazolone pigment to form a mixture; and mixing the mixture to form a homogenous mixture of the yellow pigment composition.

29 Claims, No Drawings

CO-PROCESSED PIGMENTS

FIELD OF THE INVENTION

The present invention generally relates to yellow pigment compositions. In particular, the present invention relates to yellow pigment compositions containing co-processed organic pigments and inorganic pigments.

BACKGROUND OF THE INVENTION

Many conventional organic pigment blends, when subjected to a hot melt heat test (temperatures of 200° C. to 230° C. for a period of four hours), tend to decompose and discolor. Specifically, monoazo yellow pigments tend to undesirably bloom and discolor at high temperatures, so their use is disfavored. Disazo (diarylide) yellow pigments are much stronger tinctorially and show a much lower tendency to bloom and discolor at high temperatures. However, R. Az et al reports in Dyes and Pigments, 15, 1 (1991), that diarylide yellows are degraded to potentially carcinogenic by-products (e.g., 3,3'-dichlorobenzidine) in plastics processed above 200° C., a temperature lower than that used in processing most plastics (many plastics are processed at temperatures from 250° C. to 330° C.).

Most yellow pigments have one or two desirable properties in addition to several undesirable properties. For example, some yellow pigments are strong, but have poor weathering characteristics, poor heat resistance, undesirable tints and/or shades, and/or costly starting materials. Other yellow pigments have good weathering characteristics, but have poor heat resistance, are weak, have undesirable tints and/or shades, and/or costly starting materials.

Given these circumstances, when employing yellow pigments, one must accept a compromise on at least one desirable property. There is thus an unmet need in the art for yellow pigments having many desirable properties.

SUMMARY OF THE INVENTION

The present invention provides yellow pigment compositions containing co-processed organic pigments and inorganic pigments. The co-processed pigments have improved color properties as well as improved heat stability and weathering. In particular, the improved color properties of the co-processed pigments include desirable chroma, high color strength, and excellent lightfastness. The co-processed yellow pigments of the present invention are inexpensive to produce compared to other commercially available yellow pigment compositions. Moreover, in some embodiments, the co-processed yellow pigments of the present invention do not contain chlorine, and thus do not breakdown into potentially harmful chlorine containing components.

One aspect of the invention relates to yellow pigment composition containing at least one yellow nickel titanate and at least one yellow organic pigment containing a benzimidazolone moiety.

Another aspect of the invention relates to a yellow pigment composition containing from about 5% to about 80% by weight of at least one yellow nickel titanate and from about 20% to about 95% by weight of at least one yellow benzimidazolone pigment.

Yet another aspect of the invention relates to a method of making a yellow pigment composition involving the steps of combining at least one yellow nickel titanate and at least one yellow benzimidazolone pigment to form a mixture; and mixing the mixture to form a homogenous mixture of the yellow pigment composition.

DETAILED DESCRIPTION OF THE INVENTION

The present invention provides yellow pigment compositions containing at least co-processed yellow organic pigments and yellow inorganic pigments. The yellow pigment compositions may optionally contain additional pigments and/or additives. The yellow organic pigment and yellow inorganic pigment are co-processed in that an intimate mixture is formed. The yellow pigment compositions of the present invention contain at least a yellow nickel titanate as an inorganic pigment and a yellow benzimidazolone as an organic pigment.

While not wishing to be bound by any theory, it is believed that the formation of a stable composition with desirable properties is facilitated by surface to surface interactions between the oxide inorganic pigment and the benzimidazolone moiety of the organic pigment.

Yellow nickel titanate pigment is an inorganic pigment derived from a mixture of nickel oxide and titanium oxide and optionally antimony oxide. Nickel titanate has the general formula $NiTiO_3$. In one embodiment, the yellow nickel titanate pigment is Pigment Yellow 53. Pigment Yellow 53 may be prepared by calcining a mixture of antimony oxide, nickel oxide and titanium oxide. Pigment Yellow 53 is commercially available from numerous sources, including Cerdec under the tradename of Irgacolor Yellow 10401. The yellow nickel titanate pigments are typically available in powder form.

Yellow nickel titanate pigments, including methods of their preparation, are found in the Pigment Handbook, Vol. 1, pp. 419–427 (1973), which is incorporated herein by reference. Generally, yellow nickel titanate pigments can be made by either precipitation or by calcination. The calcination process is characterized by a mixing of the raw materials required for the particular pigment (mixing. can be conducted by dry blending or by wet milling, for example). The mixture is then calcined at a high temperature, such as at about 980° C. After firing, the pigment is wet milled in a ball mill. The milled product is transferred to a filter press where it is washed and then dewatered to produce a filtercake. The filtercake is then dried and passed through a micropulverizer to produce a fine powder. The final step in the manufacturing process is to blend various batches to ensure that the finished product meets the quality control specifications for the pigment. Yellow nickel titanates can also be prepared by a precipitation process using a nickel salt with titanium dioxide, which is hydrated, and antimony oxide. The mixture is dried and calcined in the same manner as for the dry blended material.

In one embodiment, the yellow pigment compositions of the present invention contain from about 5% to about 80% by weight of at least one yellow nickel titanate inorganic pigment. In another embodiment, the yellow pigment compositions contain from about 10% to about 70% by weight of at least one yellow nickel titanate inorganic pigment. In yet another embodiment, the yellow pigment compositions contain from about 15% to about 60% by weight of at least one yellow nickel titanate inorganic pigment.

Yellow benzimidazolones are organic pigments containing a benzimidazolone moiety in its chemical structure. Benzimidazolones are azo organic pigments generally derived from an aromatic amine and a benzimidazolone coupler, wherein the aromatic amine is initially diazotized and then coupled to the benzimidazolone coupler. The coupling mixture may be heated, such as at temperatuires over 100° C. The yellow benzimidazolones may be monoazo organic pigments or disazo organic pigments.

In one embodiment, the yellow pigment compositions of the present invention contain from about 20% to about 95% by weight of at least one yellow benzimidazolone organic pigment. In another embodiment, the yellow pigment compositions contain from about 30% to about 90% by weight of at least one yellow benzimidazolone organic pigment. In yet another embodiment, the yellow pigment compositions contain from about 40% to about 85% by weight of at least one yellow benzimidazolone organic pigment.

Benzimidazolones organic pigment compositions and methods of preparing such are generally described in U.S. Pat. Nos. 4,080,321; 4,392,999; 4,555,568; 4,664,714; 5,352,281; and 5,756,757; which are hereby incorporated by reference in this regard.

Benzimidazolones organic pigment compositions are commercially available from a number of sources. The yellow benzimidazolone pigments are typically available in powder form. Examples of benzimidazolone organic pigments include Pigment Yellow 120, Pigment Yellow 151, Pigment Yellow 154, Pigment Yellow 156, and Pigment Yellow 175. The chemical formulae of some of these pigments are as follows:

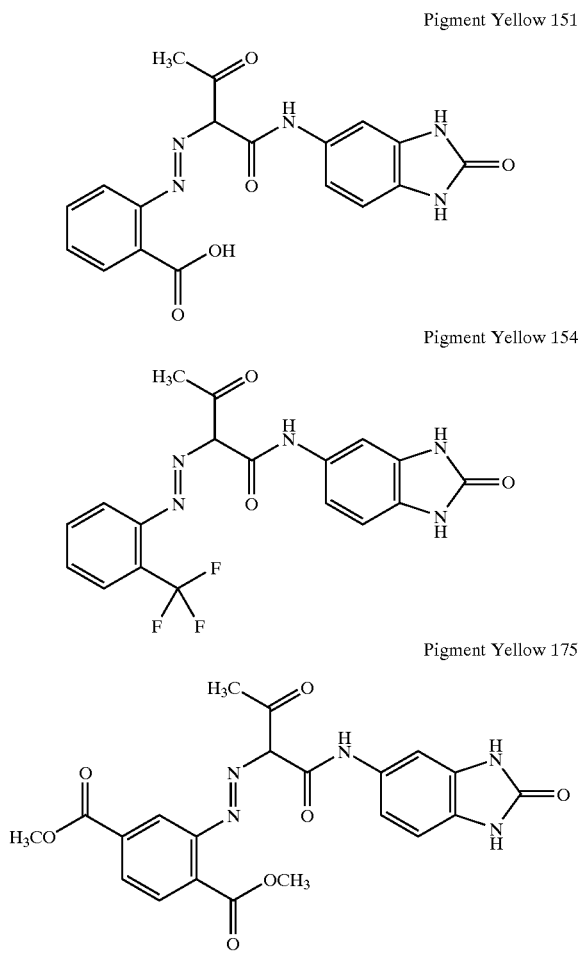

The yellow pigment compositions may optionally contain additional organic and/or inorganic pigments and/or additives. In one embodiment, the yellow pigment compositions contain from about 0.01% to about 20% by weight of additional organic and/or inorganic pigments and/or additives. In another embodiment, the yellow pigment compositions contain from about 0.1% to about 15% by weight of additional organic and/or inorganic pigments and/or additives. In another embodiment, the yellow pigment compositions contain from about 0.5% to about 10% by weight of additional organic and/or inorganic pigments and/or additives.

Examples of optional inorganic pigments include titanium dioxide, bismuth vanadate, lead chromate, cadmium zinc sulfide, cadmium barium sulfide, cadmium sulfide, potassium cobaltnitrite, lead antimoniate, nickel chromium compounds, and iron oxide. Specific examples of optional inorganic pigments include Pigment Yellow 34, Pigment Yellow 35, Pigment Yellow 37, Pigment Yellow 40, Pigment Yellow 41, Pigment Yellow 42, and Pigment Yellow 184.

Examples of optional organic pigments include isoindolinone pigments, arylide pigments, diarylide pigments, anthrapyrimidine pigments, quinophthalone pigments, nickel azomethine pigments, and pyrazolone pigments. Specific examples of optional organic pigments include Pigment Yellow 1, Pigment Yellow 3, Pigment Yellow 55, Pigment Yellow 10, Pigment Yellow 11, Pigment Yellow 13, Pigment Yellow 14, Pigment Yellow 16, Pigment Yellow 17, Pigment Yellow 61, Pigment Yellow 62, Pigment Yellow 65, Pigment Yellow 74, Pigment Yellow 81, Pigment Yellow 83, Pigment Yellow 93, Pigment Yellow 94, Pigment Yellow 95, Pigment Yellow 97, Pigment Yellow 98, Pigment Yellow 108, Pigment Yellow 110, Pigment Yellow 138, Pigment Yellow 139, Pigment Yellow 150, Pigment Yellow 152, Pigment Yellow 183, and Pigment Yellow 191.

Additives that may be optionally incorporated into the yellow pigment blends include glass beads, fillers, plasticizers, extenders, silicon dioxide, clays such as kaolin, calcium carbonate, diatomaceous earth, surfactants, dispersants, and solvents (generally for paint formulations).

In one embodiment, neither the yellow organic pigment nor the yellow inorganic pigment contain an atom of chlorine. Potential degradation products do not consequently pose safety and/or environmental problems. In another embodiment, the optional additional organic and/or inorganic pigments do not contain an atom of chlorine.

The yellow pigment compositions of the present invention are made by combining and mixing the yellow organic pigment and yellow inorganic pigment to form a homogenous mixture in any suitable manner. In other words, the yellow pigment compositions of the present invention are co-processed.

For example, in one embodiment, the yellow pigment compositions of the present invention are made by combining the yellow organic pigment and yellow inorganic pigment (and optionally one or more additives), dry blending the mixture, and then grinding or dry milling the mixture. Alternatively, the yellow pigment compositions of the present invention are made by combining the yellow organic pigment and yellow inorganic pigment (and optionally one or more additives), grinding the mixture, and then dry blending the mixture. In both of these instances, one or more additives can be optionally added before or after forming the mixture, blending the mixture, or grinding the mixture.

In another embodiment, the yellow pigment compositions of the present invention are made by combining the yellow organic pigment and yellow inorganic pigment (and optionally one or more additives) with a liquid such as water to form a slurry, optionally mixing the slurry (such as wet milling the slurry), spray drying the slurry, and then optionally grinding the spray dried mixture. One or more additives can be optionally added before or after forming the slurry, mixing the slurry, spray drying the slurry, or grinding the spray dried mixture.

In yet another embodiment, the yellow pigment compositions of the present invention are made by combining the yellow organic pigment and yellow inorganic pigment (and optionally one or more additives) with a liquid such as water to form a slurry, optionally mixing the slurry (such as wet milling the slurry), spin flash drying the slurry, and then optionally grinding the spin flash dried mixture. One or more additives can be optionally added before or after forming the slurry, mixing the slurry, spin flash drying the slurry, or grinding the spin flash dried mixture.

In still yet another embodiment, the yellow pigment compositions of the present invention are made by simply combining the yellow organic pigment and yellow inorganic pigment (and optionally one or more additives) and mixing the components in one or more of blender, such as a cone blender, mixer (wet or dry mixer), grinder, pulverizer, and the like.

The pigment compositions of the present invention provide yellow pigments having improved color strength, resistance to polar solvents, light fastness and/or heat stability and are useful as coloring agents in plastics, coatings and inks. In a preferred embodiment, the pigment compositions of the present invention provide yellow pigments having both improved color strength and improved heat stability.

In one embodiment, the pigment compositions of the present invention retain heat stability (do not substantially degrade or thermally breakdown) at temperatures up to and above about 275° C. In another the pigment compositions of the present invention retain heat stability at temperatures up to and above about 280° C. In yet another the pigment compositions of the present invention retain heat stability at temperatures up to and above about 285° C. In still yet another the pigment compositions of the present invention retain heat stability at temperatures up to and above about 290° C. (for example, from about 275° C. to about 295° C.).

In other embodiments, therefore, the present invention relates to coating compositions including paint compositions, ink compositions and plastic compositions respectively comprising major amounts of a coating vehicle such as a paint vehicle, ink vehicle or a plastic and minor amounts of the yellow pigment compositions. A major amount is at least 50% by weight. A minor amount is less than 50% by weight.

The coating, ink and plastic compositions in which the yellow pigment compositions are useful are well known to those of ordinary skill in the art. Examples of inks include printing inks and lacquers, and plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers and cellulose esters, such as ethylcellulose, nitrocellulose, cellulose acetate or cellulose butyrate, aminoplasts, in particular urea- and melamine-formaldehyde resins, alkyd resins, acrylic resins, phenoplasts, polycarbonates, polyamides, polyurethanes, casein, silicone and silicone resins, polyesters, for example polyglycol terephthalates, and polyacrylonitrile. The yellow pigment compositions are also useful for pigment printing and for the pigmenting of paper in the mass.

Due to its excellent heat resistance, the pigment is in particular suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters, and mixtures and coploymers thereof.

Examples of coating compositions include paint compositions, adhesive compositions, and powder compositions. Thus, coating compositions include liquid based coating compositions and powder based coating compositions.

See, for example, with regard to ink: R. H. Leach, editor, *The Printing Ink Manual*, Fourth Edition, Van Nostrand Reinhold (International) Co.Ltd., London (1988), particularly pages 282–591; with regard to coatings and paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference for their teachings of coating, ink, and plastic compositions, formulations and vehicles in which the pigment compositions of the present invention may be used including amounts of colorants.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

A pigment composition is made by combining 20 g of Pigment Yellow 53 and 80 g of Pigment Yellow 120 and mixing in a blender.

EXAMPLE 2

A pigment composition is made by combining 30 g of nickel titanate and 70 g of Pigment Yellow 151 and mixing in a blender.

EXAMPLE 3

A pigment composition is made by combining 40 g of Pigment Yellow 53 and 60 g of Pigment Yellow 154 and mixing in a blender.

EXAMPLE 4

A pigment composition is made by combining 35 g of nickel titanate and 65 g of Pigment Yellow 156 in water to form a slurry, wet milling the slurry, and spray drying the slurry.

EXAMPLE 5

A pigment composition is made by combining 45 g of Pigment Yellow 53 and 55 g of Pigment Yellow 175 in water to form a slurry, wet milling the slurry, and spin flash drying the slurry.

EXAMPLE 6

A pigment composition is made by combining 15 g of Pigment Yellow 53,5 g of titanium dioxide, and 80 g of Pigment Yellow 120 in water to form a slurry, wet milling the slurry, and spin flash drying the slurry.

EXAMPLE 7

A pigment composition is made by combining 30 g of nickel titanate, 5 g of kaolin, and 70 g of Pigment Yellow 151 in water to form a slurry, wet milling the slurry, and spray drying the slurry.

EXAMPLE 8

A pigment composition is made by combining 40 g of Pigment Yellow 53, 10 g of Pigment Yellow 191, and 50 g of Pigment Yellow 154 and mixing in a blender.

EXAMPLE 9

A pigment composition is made by combining 30 g of nickel titanate, 40 g of Pigment Yellow 151, and 30 g of Pigment Yellow 156 in water to form a slurry, wet milling the slurry, and spray drying the slurry.

EXAMPLE 10

A pigment composition is made by combining 20 g of Pigment Yellow 34, 25 g of Pigment Yellow 53, and 55 g of Pigment Yellow 175 in water to form a slurry, wet milling the slurry, and spin flash drying the slurry.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims. To the extent that the term "includes" is used in either the detailed description, such term is intended to be inclusive in a manner similar to the term "comprising."

What is claimed is:

1. A yellow pigment composition comprising
   at least one yellow nickel titanate; and
   at least one yellow organic pigment containing a benzimidazolone moiety.

2. The yellow pigment composition according to claim 1, wherein the yellow pigment composition comprises from about 10% to about 70% by weight of yellow nickel titanate and from about 30% to about 90% by weight of the yellow organic pigment containing the benzimidazolone moiety.

3. The yellow pigment composition according to claim 1, wherein the yellow nickel titanate comprises Pigment Yellow 53.

4. The yellow pigment composition according to claim 1, wherein the yellow organic pigment containing the benzimidazolone moiety comprises at least one of Pigment Yellow 120, Pigment Yellow 151, Pigment Yellow 154, Pigment Yellow 156, and Pigment Yellow 175.

5. The yellow pigment composition according to claim 1, further comprising at least one of titanium dioxide, bismuth vanadate, lead chromate, cadmium zinc sulfide, cadmium barium sulfide, cadmium sulfide, potassium cobaltnitrite, lead antimoniate, nickel chromium compounds, and iron oxide.

6. The yellow pigment composition according to claim 1, further comprising at least one of an isoindolinone pigment, an arylide pigment, a diarylide pigment, an anthrapyrimidine pigment, a quinophthalone pigment, a nickel azomethine pigment, and a pyrazolone pigment.

7. A yellow pigment composition comprising
   from about 5% to about 80% by weight of at least one yellow nickel titanate; and
   from about 20% to about 95% by weight of at least one yellow benzimidazolone pigment.

8. The yellow pigment composition according to claim 7, wherein the yellow nickel titanate comprises Pigment Yellow 53 and the yellow benzimidazolone pigment comprises at least one of Pigment Yellow 120, Pigment Yellow 151, Pigment Yellow 154, Pigment Yellow 156, and Pigment Yellow 175.

9. The yellow pigment composition according to claim 7, wherein the yellow pigment composition comprises from about 15% to about 60% by weight of at least one yellow nickel titanate and from about 40% to about 85% by weight of at least one yellow benzimidazolone pigment.

10. The yellow pigment composition according to claim 9, wherein the yellow nickel titanate comprises Pigment Yellow 53 and the yellow benzimidazolone pigment comprises Pigment Yellow 151.

11. The yellow pigment composition according to claim 7, further comprising at least one of glass beads, a filler, a plasticizer, an extender, silicon dioxide, a clay, calcium carbonate, diatomaceous earth, a surfactant, a dispersant, and a solvent.

12. The yellow pigment composition according to claim 7, wherein the yellow pigment composition has heat stability at temperatures up to and above about 275° C.

13. The yellow pigment composition according to claim 7, wherein the yellow pigment composition has heat stability at temperatures up to and above about 285° C.

14. A method of making a yellow pigment composition comprising
   combining at least one yellow nickel titanate and at least one yellow benzimidazolone pigment to form a mixture; and
   mixing the mixture to form a homogenous mixture of the yellow pigment composition.

15. The method according to claim 14, wherein the yellow nickel titanate comprises Pigment Yellow 53 and the yellow benzimidazolone pigment comprises at least one of Pigment Yellow 120, Pigment Yellow 151, Pigment Yellow 154, Pigment Yellow 156, and Pigment Yellow 175.

16. The method according to claim 14, wherein the mixture is a slurry formed by combining at least one yellow nickel titanate, at least one yellow benzimidazolone pigment, and water, further comprising drying the mixture to form the homogenous mixture of the yellow pigment composition.

17. The method according to claim 16, wherein drying the mixture comprises spray drying the mixture.

18. The method according to claim 16, wherein drying the mixture comprises spin flash drying the mixture.

19. The method according to claim 14, further comprising grinding the mixture to form the homogenous mixture of the yellow pigment composition.

20. A coating composition comprising a coating vehicle and the yellow pigment composition according to claim 1.

21. A coating composition according to claim 20, wherein the coating vehicle is a paint.

22. A coating composition comprising a coating vehicle and the yellow pigment composition made by the method of claim 14.

23. An ink composition comprising an ink vehicle and the yellow pigment composition according to claim 1.

24. A plastic composition comprising a plastic vehicle and the yellow pigment composition according to claim 1.

25. The plastic composition according to claim 24, wherein the plastic vehicle comprises at lest one of a polystyrene, a polyolefin, a polyacrylic compound, a polyvinyl compound, a polyester, a rubber, a cellulose ether, a cellulose ester, an aminoplast resin, an alkyd resin, an acrylic resin, a phenoplast resin, a polycarbonate, a polyamide, a polyurethane, casein, a silicone resin, a polyester, and a polyacrylonitrile.

26. A plastic composition comprising a plastic vehicle and the yellow pigment composition according to claim 7.

27. The plastic composition according to claim 26, wherein the plastic vehicle comprises at lest one of a polystyrene, a polyolefin, a polyacrylic compound, a polyvinyl compound, a polyester, a rubber, a cellulose ether, a cellulose ester, an aminoplast resin, an alkyd resin, an acrylic resin, a phenoplast resin, a polycarbonate, a polyamide, a polyurethane, casein, a silicone resin, a polyester, and a polyacrylonitrile.

28. A plastic composition comprising a plastic vehicle and the yellow pigment composition made by the method of claim 14.

29. The plastic composition according to claim 28, wherein the plastic vehicle comprises at lest one of a polystyrene, a polyolefin, a polyacrylic compound, a polyvinyl compound, a polyester, a rubber, a cellulose ether, a cellulose ester, an aminoplast resin, an alkyd resin, an acrylic resin, a phenoplast resin, a polycarbonate, a polyamide, a polyurethane, casein, a silicone resin, a polyester, and a polyacrylonitrile.

* * * * *